(12) United States Patent
Steffan et al.

(10) Patent No.: US 6,430,572 B1
(45) Date of Patent: Aug. 6, 2002

(54) RECIPE MANAGEMENT DATABASE SYSTEM

(75) Inventors: Paul J. Steffan, Elk Grove; Allen S. Yu, Fremont, both of CA (US)

(73) Assignee: Advanced Micro Devices, INC, Sunnyvale, CA (US)

( * ) Notice: Subject to any disclaimer, the term of this patent is extended or adjusted under 35 U.S.C. 154(b) by 0 days.

(21) Appl. No.: 09/264,362

(22) Filed: Mar. 8, 1999

(51) Int. Cl.[7] ............................................... G06F 17/30
(52) U.S. Cl. ..................... 707/104.1; 438/16; 438/14
(58) Field of Search .................. 707/104.1, 1; 709/227; 29/25.01; 438/14, 16, 18

(56) References Cited

U.S. PATENT DOCUMENTS

| | | | | |
|---|---|---|---|---|
| 5,349,674 A | * | 9/1994 | Calvert et al. | 395/800 |
| 5,649,169 A | * | 7/1997 | Berezin et al. | 395/500 |
| 5,761,064 A | * | 6/1998 | La et al. | 364/468.17 |
| 5,913,105 A | * | 6/1999 | McIntyre et al. | 438/16 |
| 5,960,440 A | * | 9/1999 | Brenner et al. | 707/104 |
| 6,165,805 A | * | 12/2000 | Steffan et al. | 438/14 |
| 6,200,823 B1 | * | 3/2001 | Steffan et al. | 438/14 |

* cited by examiner

*Primary Examiner*—Hosain T. Alam
*Assistant Examiner*—Tam V Nguyen
(74) *Attorney, Agent, or Firm*—H. Donald Nelson

(57) ABSTRACT

A scan tool recipe management database system for recipes utilized in the scanning of semiconductor wafers during the manufacture of the semiconductor wafers. The scan tool recipe management database system includes workstations at each scan tool for simultaneously inputting recipes and changes to the recipes to the scan tool and to a scan tool recipe database.

7 Claims, 2 Drawing Sheets

RECIPE MANAGEMENT DATABASE SYSTEM

BACKGROUND OF THE INVENTION

1. Field of the Invention

This invention relates generally to the management of a database utilized in the manufacture of high performance semiconductor devices. More specifically, this invention relates to the management of a recipe database that stores the recipes utilized in scan tools utilized in the inspection of semiconductor wafers during the manufacture of the high performance semiconductor devices.

2. Discussion of the Related Art

In order to remain competitive, a semiconductor manufacturer must continually increase the performance of the semiconductor integrated circuits being manufactured and at the same time, reduce the cost of the semiconductor integrated circuits. Part of the increase in performance and the reduction in cost of the semiconductor integrated circuits is accomplished by shrinking the device dimensions and by increasing the number of circuits per unit area on an integrated circuit chip. Another part of reducing the cost of a semiconductor chip is to increase the yield. As is known in the semiconductor manufacturing art, the yield of chips (also known as die) from each wafer is not 100% because of defects occurring during the manufacturing process. The number of good chips obtained from a wafer determines the yield. As can be appreciated, chips that must be discarded because of a defect increases the cost of the remaining usable chips.

Each semiconductor chip requires numerous process steps such as oxidation, etching, metallization and wet chemical cleaning. In order to etch metal lines, for example, a layer of photoresist is formed on the surface of the semiconductor chips and patterned by developing the photoresist and washing away the unwanted portion of the photoresist. Because the metal lines and other metal structures have "critical" dimensions, that is, dimensions that can affect the performance of the semiconductor chip, the process of forming the photoresist pattern for each layer is examined during the manufacturing process. Some of these process steps involve placing the wafer in which the semiconductor chips are being manufactured into different tools during the manufacturing process. The optimization of each of these process steps requires an understanding of a variety of chemical reactions and physical processes in order to produce high performance, high yield circuits. The ability to view and characterize the surface and interface layers of a semiconductor chip in terms of their morphology, chemical composition and distribution is an invaluable aid to those involved in research and development, process, problem solving, and failure analysis of integrated circuits.

In the course of modern semiconductor manufacturing, semiconductor wafers are routinely inspected using "scanning" tools to find and capture defects. A scanning tool determines the location and other information concerning defects that are caught and this information is stored in a data file for later recapture and inspection of any of the defects. These data files are stored in a relational database that has the ability to generate wafer maps with defects shown in their relative positions. The data database typically has the ability to send these wafer map files to various review tools within the manufacturing plant. This is very useful as it allows for re-inspection on various after-scan inspection tools within the manufacturing plant. These inspection tools include Optical Microscopes and Scanning Electron Microscopes (SEMs) that allow for classification of the defects. Images taken on the various after-scan inspection tools can be linked by linkage data to the defect on a wafer map and reviewed at a workstation at the convenience of an engineer or technician.

In order to be able to quickly resolve process or equipment issues in the manufacture of semiconductor products a great deal of time, effort and money is expended on the capture and classification of silicon based defects. Once a defect is caught and properly described, work can begin in earnest to resolve the cause of the defect, to attempt elimination of the cause of the defect, and to determine adverse effects of the defect on device parametrics and performance. In the course of typical semiconductor manufacturing and processing of semiconductor wafers a great deal of effort is increasingly being placed on determining the quality of the wafers from a defect viewpoint.

In order to scan each semiconductor product and each layer of each semiconductor product, the scan tool must have a recipe for each of the layers. The number of layers can range from approximately 30–50 layers and there may be 10–30 products that are current at any one time. Therefore, each scan tool may have as many as 1500 recipes that are needed to properly scan any of the layers that the scan tool may be required to scan. Tool operators are required to input the recipes into the scan tool and to keep the recipes current. In addition, there are different manufactures of scan tools, different models of scan tools and differences between same models of scan tools. This requires that the recipes be individualized for each layer, for each model tool and for each tool. The large number of recipes makes it difficult to monitor which model has which recipe and what version of recipe is installed on the machine. The recipes control parameters such as the sensitivity, inspection areas, thresholds, light levels, and other setup parameters for every device and layer for which inspection data is required. These recipes basically control how the tool looks at the wafer, what level of difference constitutes a defect, and how much of the wafer will be scanned. The data output from the scan tool as a result of these scans is used to statistically control the manufacturing line and a small variation in defectivity level can trigger a line shutdown. As can be appreciated, the integrity and validity of the recipes used to control the scan tools is critical because of the control of the manufacturing line exerted by these recipes.

There does not exist a method of adequately monitoring, controlling, or even a method of viewing the setup parameters of these critical recipes on a global basis. Even more critical, there is no way to tell if a change has been made to the recipe which could either make it more or less sensitive. Because of this, there is no way to verify that the recipe/tool is not at fault when there is a shift in a performance chart. In addition, there is no record of when recipe was updated and who updated the recipe. Therefore, it is virtually impossible for an operator to know the status of the recipe on any one scan tool and, in addition, it is virtually impossible for an operator to know if the recipes on different machines are the same for scanning the same layer on the same product. Because of the difficulty of determining the status or validity of the recipes on the scan tools, it is difficult to determine the quality of the layer being scanned. This in turn makes it difficult to improve the manufacturing process.

Therefore, what is needed is a system to monitor the recipes that are being input into each scan tool and to monitor the status of the recipes that have been input into each scan tool to ensure that all recipes are up-to-date and are measuring the same parameters.

SUMMARY OF THE INVENTION

According to the present invention, the foregoing and other objects and advantages are attained by a scan tool recipe management database system for recipes that includes workstations at each scan tool that simultaneously inputs recipes to the scan tool and to a scan tool recipe database.

In accordance with an aspect of the invention, changes to the recipes are also simultaneously input to the scan tool and to the scan tool recipe database.

In accordance with another aspect of the invention, defect information generated by the scan tool based on the recipe input to the scan tool is input to a defect management system.

In accordance with another aspect of the invention, a recipe manager determines the status and validity of the recipe at a workstation with access to the scan tool recipe database.

In accordance with still another aspect of the invention, the defect information and the recipe information are correlated to provide yield analysis and trending analysis.

In accordance with still another aspect of the invention, the defect information and the recipe information are input to a SAPPHIRE system where the defect information and recipe information is correlated to provide statistical analysis data.

The present invention thus effectively provides a scan tool recipe management database system for recipes that allows rapid verification of recipe integrity, enables comparison of scan tool to scan tool recipe matching, allows fabrication plant to fabrication plant recipe comparison, provides easy recipe management, enables trending analysis from a recipe change, allows the recreation of old recipes and allows a comparison of recipe setups by different operators.

The present invention is better understood upon consideration of the detailed description below, in conjunction with the accompanying drawings. As will become readily apparent to those skilled in the art from the following description, there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

Reference is now made in detail to specific embodiments of the present invention which illustrate the best mode presently contemplated by the inventors for practicing the invention.

Figure 1:
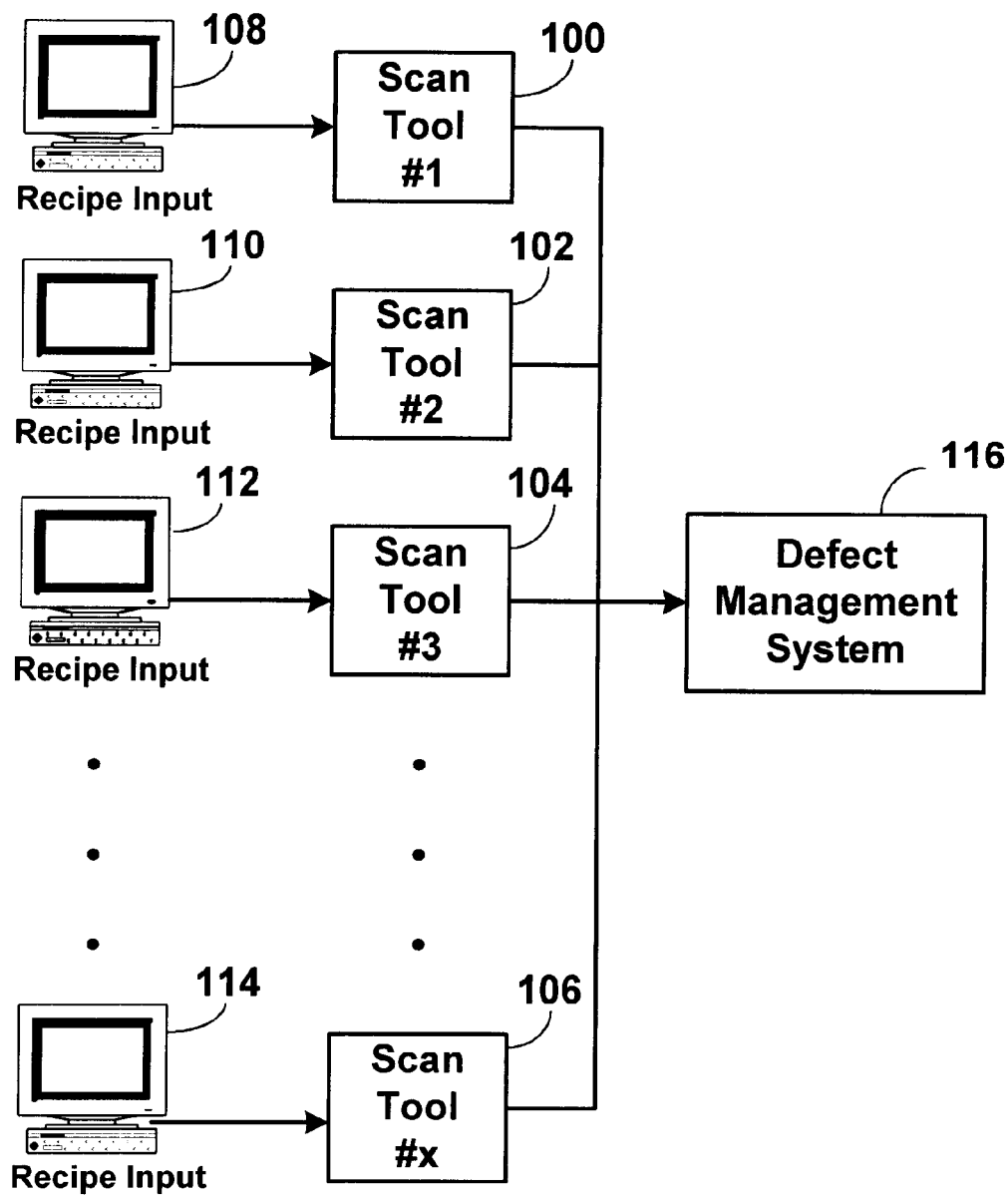
FIG. 1 illustrates a typical methodology of programming scan tools used for inspecting layers of semiconductor wafers being manufactured in a semiconductor manufacturing process.

FIG. 1 illustrates a prior art methodology of programming scan tools used for inspecting layers of semiconductor wafers being manufactured in a semiconductor manufacturing process. As is known in the semiconductor manufacturing art, a manufacturing lot of wafers is subjected to a series of processes to manufacture layers of the semiconductor devices being manufactured. After selected layers have been finished, selected wafers, called inspection wafers, are placed in one or more scan tools and inspected for defects. A manufacturing facility may have as many as 50 scan tools that can be used to scan wafers. The scan tools are shown in FIG. 1 as Scan Tool # 1 100, Scan Tool # 2 102, Scan Tool # 3 104 and Scan Tool # x 106. An operator inputs recipes to Scan Tool # 1 100 at a workstation 108, an operator inputs recipes to Scan Tool # 2 102 at a workstation 110, an operator inputs recipes to Scan Tool # 3 104 at a workstation 112, and an operator inputs recipes to Scan Tool # x 106 at workstation 114. The recipes input to the Scan Tools 100, 102, 104 and 106 are specific to the semiconductor device being manufactured and to the layer of the semiconductor device being manufactured as well as being specific to the scan tool being used. Typically, the manufacturer of the scan tool provides a generic scanning recipe that is then particularized by an operator for each product and for each layer. Each of the Scan Tools 100, 102, 104, and 106 captures defects on the wafers being inspected based upon parameters in the recipes that have been input to the respective scan tools. The Scan Tools 100, 102, 104, and 106, send information concerning the captured defects to a Defect Management System 116. The Defect Management System 116 uses the defect information and further monitors the processing of the wafers based upon the defect information. The further processing of the wafers is well known in the semiconductor manufacturing art and will not be discussed.

Figure 2:
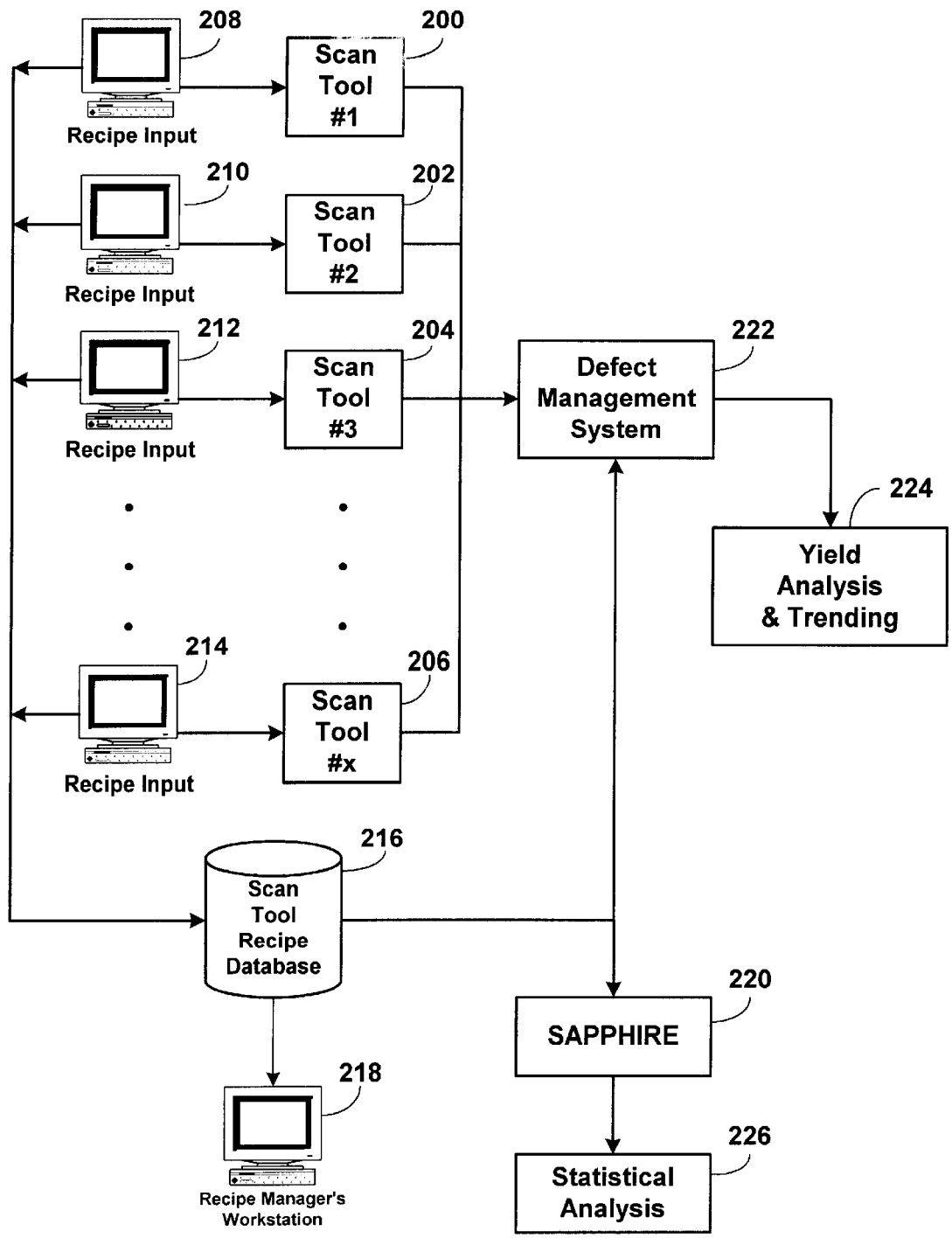
FIG. 2 illustrates a methodology of programming and monitoring recipes input into scan tools used for inspecting layers of semiconductor wafers being manufactured in a semiconductor manufacturing process.

FIG. 2 illustrates a methodology of programming and monitoring recipes input into scan tools in accordance with the present invention. The scan tools are utilized for inspecting layers of semiconductor wafers being manufactured in a semiconductor manufacturing process. As is known in the semiconductor manufacturing art, a manufacturing lot of wafers is subjected to a series of processes to manufacture layers of the semiconductor devices being manufactured. After selected layers have been finished, selected wafers, called inspection wafers, are placed in a scan tool and inspected for defects. A manufacturing facility may have as many as 50 scan tools that can be used to scan wafers. The scan tools are shown in FIG. 2 as Scan Tool # 1 200, Scan Tool # 2 202, Scan Tool #3 204 and Scan Tool # x 206. An operator inputs recipes to Scan Tool # 1 200 at a workstation 208, an operator inputs recipes to Scan Tool # 2 202 at a workstation 210, an operator inputs recipes to Scan Tool # 3 204 at a workstation 212, and an operator inputs recipes to Scan Tool #4 206 at a workstation 214. The recipes input to the Scan Tools 200, 202, 204, and 206 are specific to the semiconductor device being manufactured and to the layer of the semiconductor device being manufactured as well as being specific to the scan tool being used. Typically, the manufacturer of the scan tool provides a generic scanning recipe that is then particularized by an operator for each semiconductor product and for each layer of the product. In addition, because the recipes may be entered into different scan tools by different operators, there will be different recipes entered for the same product, layer and scan tool because of the different operators. The recipes control parameters such as the sensitivity, inspection areas, thresholds, light levels, and other setup parameters for every device and layer for which inspection data is required. These recipes basically control how the tool looks at the wafer, what level of difference constitutes a defect, and how much of the wafer will be scanned. The data output from the scan tool as a result of these scans is used to statistically control the manufacturing line and a small variation in defectivity level can trigger a line shutdown. As can be appreciated, the integrity and validity of the recipes used to control the scan tools are critical because of the control of the manufacturing line exerted by these recipes.

The recipes input to the Scan Tools 200, 202, 204, and 206 are simultaneously input into the Scan Tool Recipe Database 216, which keeps a record of the time/date of the original recipe and a record of which operator input the original recipe. In addition, any changes or updates to the recipes are also simultaneously input into the Scan Tool Recipe Database 216, which keeps a record of the time/date of any changes and which operator made each change to the recipe. The database in the Scan Tool Recipe Database is available for review by the Recipe Manager at the Recipe Manager's Workstation 218. This allows the Recipe Manager to determine the status of each recipe in each of the scan tools and to determine the differences, if any, between each of the recipes. In addition, this allows the Recipe Manager to determine which operator may be responsible if faulty recipes are being entered into any of the scan tools. The database in the Scan Tool Recipe Database is also available for review and analysis by the SAPPHiRE System (Systematic Approach to Product Performance History and Reliability Engineering) 220.

Each of the Scan Tools, 200, 202, 204, and 206 captures defects on the wafers being inspected based upon parameters in the recipes that have been input to the respective scan tools. Because the Recipe Manager has had the opportunity to determine the validity of each of the recipes in the respective scan tools, there is assurance that the defect information generated by the Scan Tools 200, 202, 204, and 206 is the most current defect information. The Scan Tools 200, 202, 204, and 206, send information concerning the captured defects to a Defect Management System 222. The Defect Management System 222 uses the defect information and further monitors the processing of the wafers based upon the most current defect information. This assures that further processing of the wafers will be consistent with the most up-to-date information available and insures that the highest possible yield will be obtained. The further processing of the wafers is well known in the semiconductor manufacturing art and will not be further discussed. The information in the Scan Tool Recipe Database 216 is available to the Defect Management System 222 and the correlated information concerning defects and the recipes used to capture the defects is used by a Yield Analysis & Trending System 224 to predict the yield of the wafers being processed.

As discussed above, the information in the Scan Tool Recipe Database is input into the SAPPHiRE System 220 where it is correlated with defect information from the Defect Management System 222. The SAPPHiRE System correlates the recipe information received from the Scan Tool Recipe Database 216 with the defect information received from the Defect Management System 222 to obtain Statistical Analysis Data, at 226. The Statistical Analysis Data includes, but is not limited to, data such as the effects of a particular recipe change on yield.

The benefits of the present invention are as follows:
1. Allows rapid verification of recipe integrity.
2. Enables comparison of tool to tool recipe matching.
3. Allows Fabrication Plant to Fabrication Plant recipe comparison.
4. Enables ease of recipe management.
5. Enables trending analysis by recipe change.
6. Allows recreation and input of any prior recipe.
7. Allows comparison of recipes by different operators.

In summary, the results and advantages of the present invention can now be more fully realized. The present invention thus effectively provides a scan tool recipe management database system for recipes that allows rapid verification of recipe integrity, enables comparison of scan tool to scan tool recipe matching, allows fabrication plant to fabrication plant recipe comparison, provides easy recipe management, enables trending analysis from a recipe change, allows the recreation of old recipes and allows a comparison of recipe setups by different operators.

The foregoing description of the embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A scan tool recipe management database ,.system for recipes, comprising:
    at least one scan tool;
    a scan tool recipe database;
    a workstation that simultaneously inputs a recipe into the at least one scan tool and into the scan tool recipe database and that simultaneously inputs a changes to a recipe into the scan tool recipe database, wherein the recipes control parameters are sensitivity, inspection areas, thresholds, light levels and other setup parameters for every device and layer of a device to be inspected,
    a defect management system, wherein information concerning defects captured by the at least one scan tool based on the recipe input into the at least one scan tool is input; and
    a SAPPHiRE system, wherein information from the defect management system and information from the scan tool recipe database is correlated to provide statistical analysis data.

2. The scan tool recipe management database system of claim 1 further comprising a workstation for a recipe manager, wherein the status and validity of the recipe input to the at least one scan tool can be determined by the recipe manager.

3. The scan tool recipe management database system of claim 2 further comprising a yield analysis and trending system, wherein information from the defect management system and information from the scan tool recipe database is correlated to provide yield analysis and trending analysis.

4. A method of managing scan tool recipes in a semiconductor manufacturing system, the method comprising simultaneously inputting a recipe and changes to recipe into at least one scan tool and into a scan tool recipe database, wherein the recipes control parameters are sensitivity, inspection areas, thresholds, light levels and other setup parameters for every device and layer of a device to be inspected, inputting information to a defect management system concerning defects captured by the at least one scan tool based on the recipe to input and inputting information from the defect management system into SAPPHiRE system, wherein the information from the scan tool recipe database is correlated to provide statistical analysis data.

5. The method of claim 4 further comprising reviewing the status and validity of the recipe input to the at least one scan tool.

6. The method of claim 5 further comprising correlating recipe information from the scan tool recipe database and defect information from the defect management system to provide yield analysis and trending analysis.

7. The method of claim 6 further comprising correlating recipe information from the scan tool recipe database and defect information from the defect management system to provide statistical analysis data.

* * * * *